United States Patent
Lin et al.

(10) Patent No.: US 9,554,059 B1
(45) Date of Patent: Jan. 24, 2017

(54) EXPOSURE CONTROL SYSTEM AND ASSOCIATED EXPOSURE CONTROL METHOD

(71) Applicant: Quanta Computer Inc., Taoyuan (TW)

(72) Inventors: Chin-An Lin, Taoyuan (TW);
Chung-Te Li, Taoyuan (TW);
Keng-Sheng Lin, Taoyuan (TW);
Hao-Jen Wang, Taoyuan (TW);
Hsin-Yu Chen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 3 days.

(21) Appl. No.: 14/873,711

(22) Filed: Oct. 2, 2015

(30) Foreign Application Priority Data

Jul. 31, 2015 (TW) .............................. 104124856 A

(51) Int. Cl.
*H04N 5/235* (2006.01)
*H04N 5/335* (2011.01)
*H04N 5/355* (2011.01)

(52) U.S. Cl.
CPC .......... *H04N 5/2355* (2013.01); *H04N 5/2351* (2013.01); *H04N 5/2353* (2013.01); *H04N 5/2356* (2013.01); *H04N 5/35554* (2013.01); *H04N 5/35581* (2013.01)

(58) Field of Classification Search
None
See application file for complete search history.

(56) References Cited

U.S. PATENT DOCUMENTS

| 6,825,884 B1 | 11/2004 | Horiuchi | |
|---|---|---|---|
| 7,646,414 B2 * | 1/2010 | Koseki | H04N 5/23293 348/218.1 |
| 2010/0232685 A1 * | 9/2010 | Yokokawa | H04N 5/142 382/159 |
| 2014/0205193 A1 * | 7/2014 | Umezu | H04N 5/23264 382/169 |

OTHER PUBLICATIONS

Chinese language office action dated Oct. 21, 2016, issued in application No. TW 104124856.

* cited by examiner

*Primary Examiner* — Mark T Monk
(74) *Attorney, Agent, or Firm* — McClure, Qualey & Rodack, LLP

(57) ABSTRACT

An exposure-control system and an associated exposure control method are provided. The exposure-control system includes: an image capturing unit configured to capture a long-exposure image and a short-exposure image with a first exposure value and a second exposure value, respectively; and a processor, configured to calculate histograms of the long-exposure image and the short-exposure image, and calculate an exposure ratio according to the calculated histograms, the first and second exposure values, wherein when the exposure ratio is smaller than a first threshold, the processor switches a current exposure mode to a low dynamic range mode. When the exposure ratio is larger than a second threshold, the processor switches the current exposure mode to a high dynamic range mode. When the exposure ratio is between the first threshold and the second threshold, the processor does not switch the current exposure mode.

12 Claims, 4 Drawing Sheets

EXPOSURE CONTROL SYSTEM AND ASSOCIATED EXPOSURE CONTROL METHOD

CROSS REFERENCE TO RELATED APPLICATIONS

This Application claims priority of Taiwan Patent Application No. 104124856, filed on Jul. 31, 2015, the entirety of which is incorporated by reference herein.

BACKGROUND OF THE INVENTION

Field of the Invention

The present invention relates to image processing, and, in particular, to an exposure control system and an associated exposure control method capable of adjusting the current exposure mode according to a long-exposure image and a short-exposure image.

Description of the Related Art

The dynamic range captured by internal optical sensors in cameras or video recorders on the market is about 1000:1 (i.e. the ratio of the brightest pixel to the darkest pixel). The dynamic range captured by optical sensors in professional cameras or video recorders is usually within 10000:1. However, the dynamic range of a common indoor scene is over 2000:1, and the dynamic range of a common outdoor scene is over 1000000:1. In other words, the optical sensors in the aforementioned cameras or video recorders can only capture a portion of the information of the scene.

Generally, a conventional exposure control system adjusts the average brightness value of the whole image to a predetermined brightness value set by the user, but the image effect is not good for dynamic images having a high dynamic range. Accordingly, there is demand for an exposure control system and an associated exposure control method to solve the aforementioned problem.

BRIEF SUMMARY OF THE INVENTION

A detailed description is given in the following embodiments with reference to the accompanying drawings.

In an exemplary embodiment, an exposure-control system is provided. The exposure-control system comprises: an image capturing unit configured to capture a long-exposure image and a short-exposure image with a first exposure value and a second exposure value, respectively; and a processor, configured to calculate histograms of the long-exposure image and the short-exposure image, and calculate an exposure ratio according to the calculated histograms, the first and second exposure values, wherein when the exposure ratio is smaller than a first threshold, the processor switches a current exposure mode to a low dynamic range mode. When the exposure ratio is larger than a second threshold, the processor switches the current exposure mode to a high dynamic range mode. When the exposure ratio is between the first threshold and the second threshold, the processor does not switch the current exposure mode.

In another exemplary embodiment, an exposure control method for use in a exposure control system, wherein the exposure control system comprises an image capturing unit. The method includes the steps of: utilizing the image capturing unit to take a long-exposure image and a short-exposure image to a scene with a first exposure value and a second exposure value, respectively; calculating a target long-exposure time and a target short-exposure time according to histograms of the long-exposure image and the short-exposure image, the first exposure value, and the second exposure value, and calculating an exposure ratio according to the target long-exposure time and the target short-exposure time; switching a current exposure mode of the exposure control system to a low dynamic range mode when the exposure ratio is smaller than a first threshold; switching the current exposure mode of the exposure control system to a high dynamic range mode, and combining the long-exposure image and the short-exposure image to a high dynamic range image when the exposure ratio is larger than a second threshold, wherein the second threshold is larger than the first threshold; and not switching the current exposure mode when the exposure ratio is between the first threshold and the second threshold.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
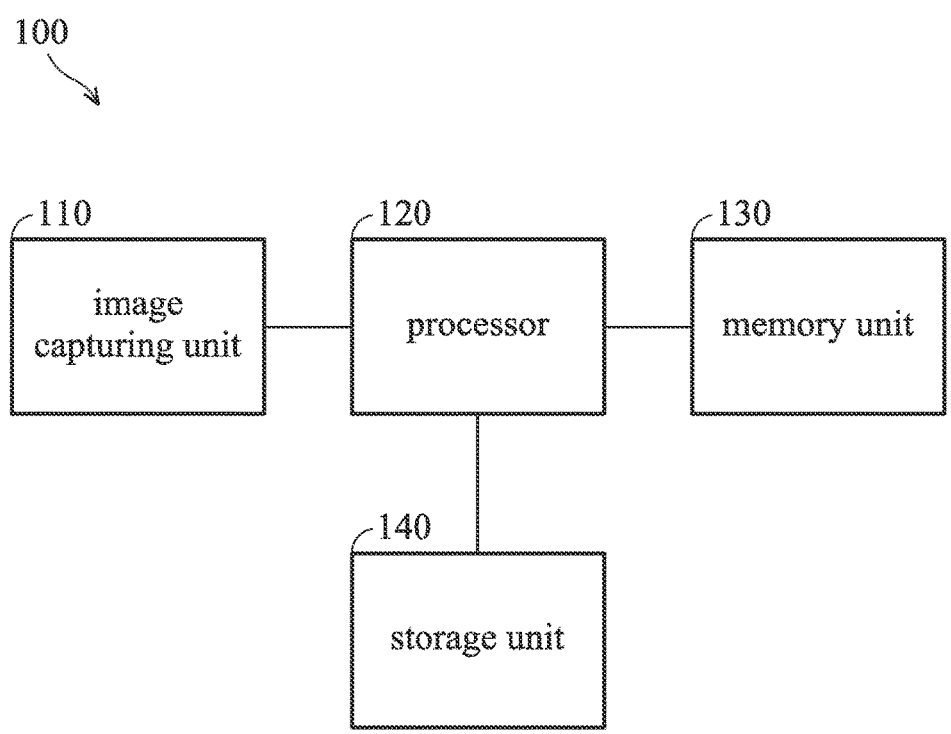
FIG. 1 is a block diagram of an exposure-control system 100 in accordance with an embodiment of the invention.

FIG. 1 is a block diagram of an exposure-control system 100 in accordance with an embodiment of the invention. As shown in FIG. 1, the exposure-control system 100 includes an image capturing unit 110, a processor 120, a memory unit 130, and a storage unit 140. The image capturing unit 110 is configured to capture images of a scene. The storage unit 140 stores a high dynamic range imaging module for image processing. For example, the memory unit 130 is a volatile memory such as a dynamic random access memory (DRAM). The storage unit 140 is a non-volatile memory 140 such as a hard disk, a flash memory, etc. The processor 120 loads program codes of the high dynamic range imaging module stored in the storage unit 140 into the memory unit 130, and performs corresponding image processing on the images captured by the image capturing unit 110.

The image capturing unit 110 has a function of multi-exposure. That is, the image sensor in the image capturing unit 110 may perform image exposure with different values and generate two images with different exposure values. The increase of exposure time or sensitivity will increase the exposure value.

Figure 2A:
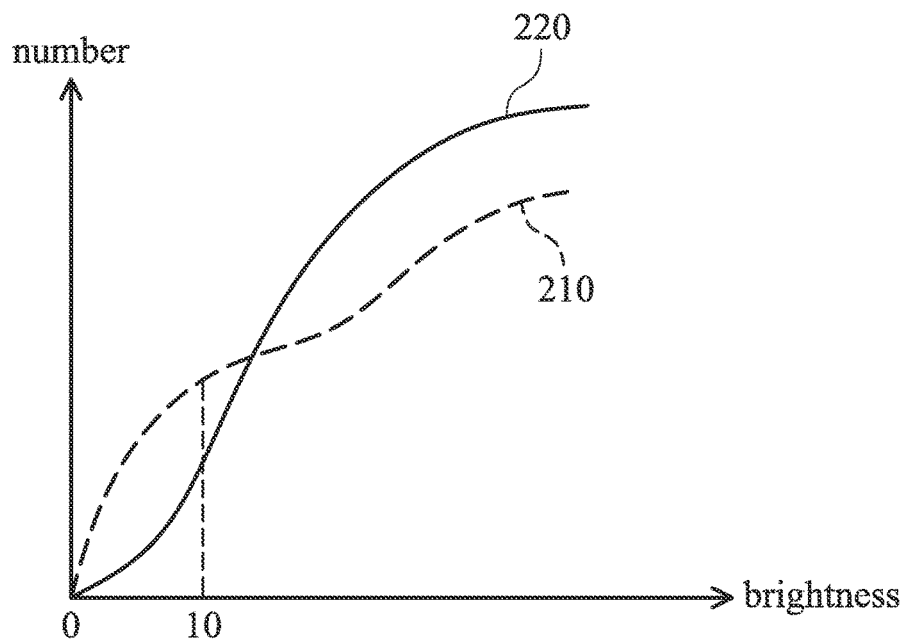
FIGS. 2A and 2B are histograms of a long-exposure image and a short-exposure image in accordance with an embodiment of the invention.
Figure 2B:
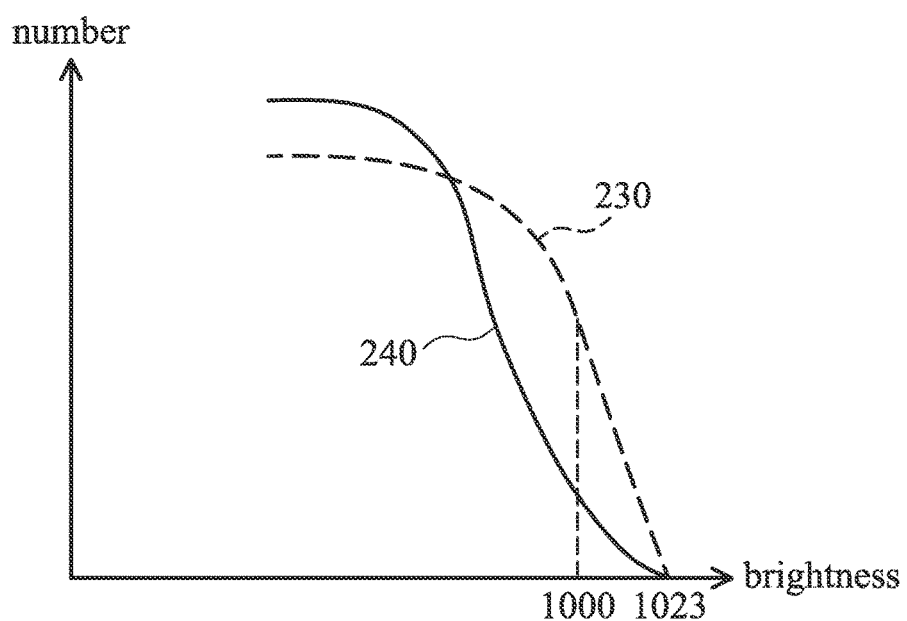

FIGS. 2A and 2B are histograms of a long-exposure image and a short-exposure image in accordance with an embodiment of the invention. In a scene at a specific location, the dynamic range does not change significantly within a period of time. Accordingly, the first x % of the darkest pixels and the first y % of the brightest pixels in the initial captured image are used to estimate the dynamic range of the scene. The ratio of x and y can be calibrated according to different applications or sensors. Since the dynamic range captured by the image sensor is limited, the exposure-control system 100 controls that the first x % of the darkest pixels are capturable in the long-exposure image. Similarly, the exposure-control system 100 controls that the first y % of the brightest pixels are capturable in the short-exposure image. Specifically, when generating a high dynamic range image, the exposure-control system 100 considers the continuousness and convergence speed of the dynamic images, and controls the first x % of the darkest pixels and the first y % of the brightest pixels are within a predetermined range. When the exposure value is converged, the exposure-control system 100 may estimate the dynamic range of the scene according to the exposure ratio.

In the embodiment, the initial long-exposure time $T_{L,INIT}$ and the initial short-exposure time $T_{S,INIT}$ is not specifically designed, and the initial long-exposure time $T_{L,INIT}$ is just longer than the short-exposure time $T_{S,INIT}$. For example, in an embodiment, the initial long-exposure time is 100 ms, and the initial short-exposure time $T_{S,INIT}$ is 51 ms.

In the configuration of the high dynamic range imaging module of the invention, the number of pixels having brightness values lower than a first predetermined brightness value (e.g. 10) is smaller than a first ratio (e.g. 2%, where x=2) of the number of all pixels in the long-exposure image. The processor 120 calculates the number of pixels having brightness values lower than the first predetermined brightness value according to the histogram of the long-exposure image (i.e. the first image).

As shown in FIG. 2A, the histogram of the pixels having relatively low brightness values in the initial long-exposure image is shown in curve 210, and the number of pixels having brightness values lower than a first predetermined brightness value (e.g. 10) is larger than the first ratio (e.g. 2%) in the initial long-exposure image. Specifically, in curve 210, the number of pixels having brightness values lower than 10 is 4% of the total number of pixels, which is larger than the first ratio (e.g. 2%). Accordingly, the number of pixels having brightness values lower than the first predetermined brightness value does not match the required condition (e.g. the number of pixels having brightness values lower than 10 is only 2% of the total number of pixels).

Thus, the processor 120 determines that there are too many pixels having low brightness values, and the curve 210 should be moved or extended toward right, so that the curve 220 in the calibrated histogram may match the condition that the number of pixels having brightness values lower than 10 is smaller than 2% of the total number of pixels. For example, the processor 120 may increase the exposure value (e.g. increase the exposure time or sensitivity) of the long-exposure image, such that the number of pixels having low brightness values is relatively decreased, thereby matching the condition that the number of pixels having brightness values lower than the first predetermined brightness value is smaller than the first ratio of the total number of pixels in the long-exposure image.

In other words, given that the image sensor of the image capturing unit 110 has a linear camera opto-electronic conversion function, when the exposure value is increased, the brightness value of the pixels captured by the image capturing unit 110 is also linearly increased. For ease of description, only the exposure time is considered in the aforementioned exposure value, and it is assumed that the number of pixels having brightness values lower than 10 in the curve 210 is smaller than a first ratio (e.g. 2%), and it is also assumed that the number of pixels having brightness values lower than 20 in curve 220 is smaller than the first ratio (e.g. 2%). Accordingly, the processor 120 calculates the target long-exposure time $T_L = T_{L,INIT} * (20/10) = 200$ ms.

As shown in FIG. 2B, the histogram of the pixels having relatively high brightness values in the initial short-exposure image is shown in the curve 230, and the number of pixels (e.g. 4%) having brightness values higher than a second predetermined brightness value (e.g. 1020) is larger than the second ratio (e.g. 2%) in the initial short-exposure image. Thus, the processor 120 determines that there are too many pixels having high brightness values in the initial short-exposure image, and the curve 230 should be moved or extended toward left, so that the number of pixels having brightness values higher than the second predetermine brightness value (e.g. 1020) is smaller than the second ratio (e.g. 2%) of the total number of pixels in the curve 240. For example, the processor 120 may decrease the exposure value of the short-exposure image such as decreasing the exposure time or the sensitivity, such that the number of pixels having high brightness values is relatively decreased, thereby matching the condition that the number of pixels having brightness values higher than the second predetermined brightness value is smaller than the second ratio of the total number of pixels.

Similarly, given that the image sensor of the image capturing unit 110 has a linear camera opto-electronic conversion function, the brightness values of pixels captured by the image capturing unit 110 is also linearly decreased when the exposure is decreased. For ease of description, only the exposure time is considered in the aforementioned exposure value, and it is assumed that the number of pixels having brightness values higher than 1020 in the curve 230 is smaller than a first ratio (e.g. 2%), and it is also assumed that the number of pixels having brightness values higher than 1000 in the curve 240 is smaller than the first ratio (e.g. 2%). Accordingly, the processor 120 calculates the target short-exposure time $T_S = T_{S,INIT} * (1000/1020) = 50$ ms.

When the target long-exposure time for the long-exposure image and the target short-exposure time for the short-exposure image have been calibrated, the processor 120 calculates the exposure ratio $R = T_L/T_S$ according to the target long-exposure time and the target short-exposure time, so that a high dynamic range image can be generated according to the calibrated long-exposure image and short-exposure image.

In practical applications, the high dynamic range image is not used in all scenes. For example, if the dynamic range of the scene is not wide (i.e. low dynamic range), the automatic exposure system built into the cameras on the market can be used to take a single image. The automatic exposure system built into the cameras on the market usually sets that the average brightness value or the median brightness value of a captured image is within a predetermined range, e.g. brightness value 128, and then captures the single image according to the associated parameters (e.g. ISO, aperture, and shutter).

The processor 120 may determine whether the current scene has a high dynamic range or a low dynamic range according to the exposure ratio based on the target long-exposure time $T_L$ and target short-exposure time $T_S$, and then use a high dynamic range mode (i.e. generating the high dynamic range image using the aforementioned flow) or a low dynamic range mode (i.e. using the parameters of the automatic exposure system built into the camera to take a single image) according to the determination result.

Specifically, if the exposure ratio R is smaller than or equal to a first threshold (e.g. 2), it indicates that the target long-exposure time $T_L$ is close to the target short-exposure time $T_S$, or even that the target long-exposure time $T_L$ is shorter than the target short-exposure time $T_S$ (e.g. the exposure ratio is smaller than 1). Accordingly, the dynamic rage of the captured long-exposure image and short-exposure image is very limited, so that the image capturing unit 110 may use the low dynamic range mode to cover the dynamic range of the scene. Accordingly, if the exposure ratio is smaller than the first threshold, the processor 120 determines that the current scene is a low dynamic range scene, and the low dynamic range mode is used to take a single image using the automatic exposure system built into the camera.

Conversely, if the exposure ratio is larger than a second threshold (e.g. 3) and the second threshold is larger than the first threshold, it indicates that the difference between the target long-exposure time and the target short-exposure time is larger. Accordingly, the captured long-exposure image and short-exposure image has a larger dynamic range, so that the image capturing unit 110 has to use the high dynamic range mode to cover the dynamic range of the current scene. Thus, if the exposure ratio is larger than the second threshold, the processor 120 determines that the current scene is a high dynamic range scene, and the high dynamic range mode is used to generate a high dynamic range image using the long-exposure image and the short-exposure image described in the aforementioned flow.

In practical applications, the image capturing unit 110 captures video images repeatedly. Although the dynamic range of the same scene is usually fixed, the histograms of two consecutive images may change significantly due to "scene change". If the low dynamic range mode and the high dynamic range mode are switched rapidly, it may cause flickers or artifacts to appear in the output images.

To solve the aforementioned problem, the processor 120 may set that the second threshold is larger than the first threshold, such as setting the first threshold to 2 and setting the second threshold to 3, and thus a margin between the first threshold and the second threshold can be defined. When the exposure ratio R is smaller than or equal to the first threshold, the processor 120 switches the current exposure mode to the low dynamic range mode. When the exposure ratio R is larger than or equal to the second threshold, the processor 120 switches the current exposure mode to the high dynamic range mode. When the exposure ratio is between the first threshold and the second threshold, the processor 120 does not switch the current exposure mode, and the exposure mode of the previous image is used, so that fast switching between the low dynamic range and the high dynamic range can be avoided. It should be noted that the first threshold and the second threshold can be calibrated according to practical conditions. Furthermore, the current exposure mode is not switched between the low dynamic range mode and the high dynamic range mode due to some boundary conditions or noises of the pixels, and flickering of output images can be avoided.

It should be noted that the processor 120 calculates the histogram of the image N based on the order of capture time of the video images, and calculates the target exposure time of the long-exposure image and the short-exposure image of the image N. When the image capturing unit 110 captures the image N+1, the current exposure time of the long-exposure image and the short-exposure image for the image N+1 is based on the target exposure time of the image N. Similarly, the current exposure time of the long-exposure image and the short-exposure image for the image N+1 is used to calculate the target exposure time of the long-exposure image and the short-exposure image for the image N+2.

Figure 3A:
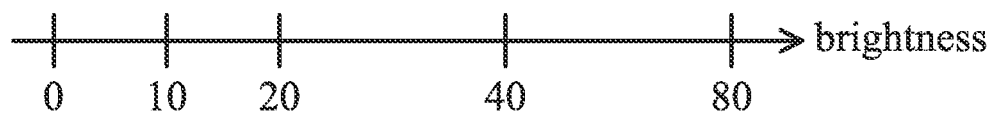
FIGS. 3A and 3B are diagrams of brightness intervals in the histograms for the long-exposure image and the short-exposure image in accordance with another embodiment of the invention.
Figure 3B:
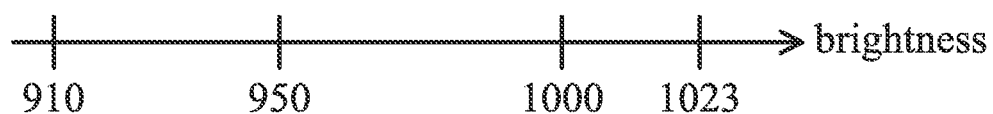

FIGS. 3A and 3B are diagrams of brightness intervals in the histograms for the long-exposure image and the short-exposure image in accordance with another embodiment of the invention. In another embodiment, when the processor 120 calculates the target exposure time of the long-exposure image and the short-exposure image, the processor 120 calculates the number of pixels within different brightness intervals in the histograms. As shown in FIG. 3A, when the processor 120 calculates the target exposure time of the long-exposure image, the processor 120 calculate the accumulated number of pixels in the brightness internals 0~10, 0~20, 0~40, 0~80, 0~160, etc. For example, if the number of pixels in the brightness internal 0~20 (e.g. 4%) is larger than the first ratio (e.g. 2%), the processor 120 may also extend the brightness intervals in FIG. 3A toward right, and the pixels in the brightness interval 0~20 will be extended to the brightness interval 0~40. Accordingly, the accumulated number of pixels having brightness values under 20 can be controlled within the first ratio. Briefly, in the embodiment, if the initial long-exposure time $T_{L,INIT}$ is 100 ms, the target long-exposure time $T_L = T_{L,INIT} * 2 = 200$ ms.

As shown in FIG. 3B, when the processor 120 calculates the target exposure-time of the short-exposure image, the processor 120 calculates the accumulated number of pixels within the brightness intervals 1000~1023, 950~1023, 910~1023, etc. For example, if the number of pixels within the brightness internal 1000~1023 (e.g. 4%) is larger than the second ratio (e.g. 2%), the processor 120 may also extend the brightness intervals in FIG. 3B toward left, and the pixels in the brightness interval 1000~1023 will be extended to the brightness interval 950~1023. Accordingly, the accumulated number of pixels having brightness value over 1000 can be controlled within the second ratio. Similarly, the processor 120 may calculate the target short-exposure time based on associated ratios. It should be noted that, for ease of description, the brightness intervals in the aforementioned embodiment are designed with a geometric progression, but the brightness intervals of the invention can be calibrated according to practical conditions. In other words, the invention is not limited to the aforementioned brightness intervals or geometric progressions, and any brightness intervals capable of preventing flickers can be used in the exposure determination strategy in the invention.

Figure 4:
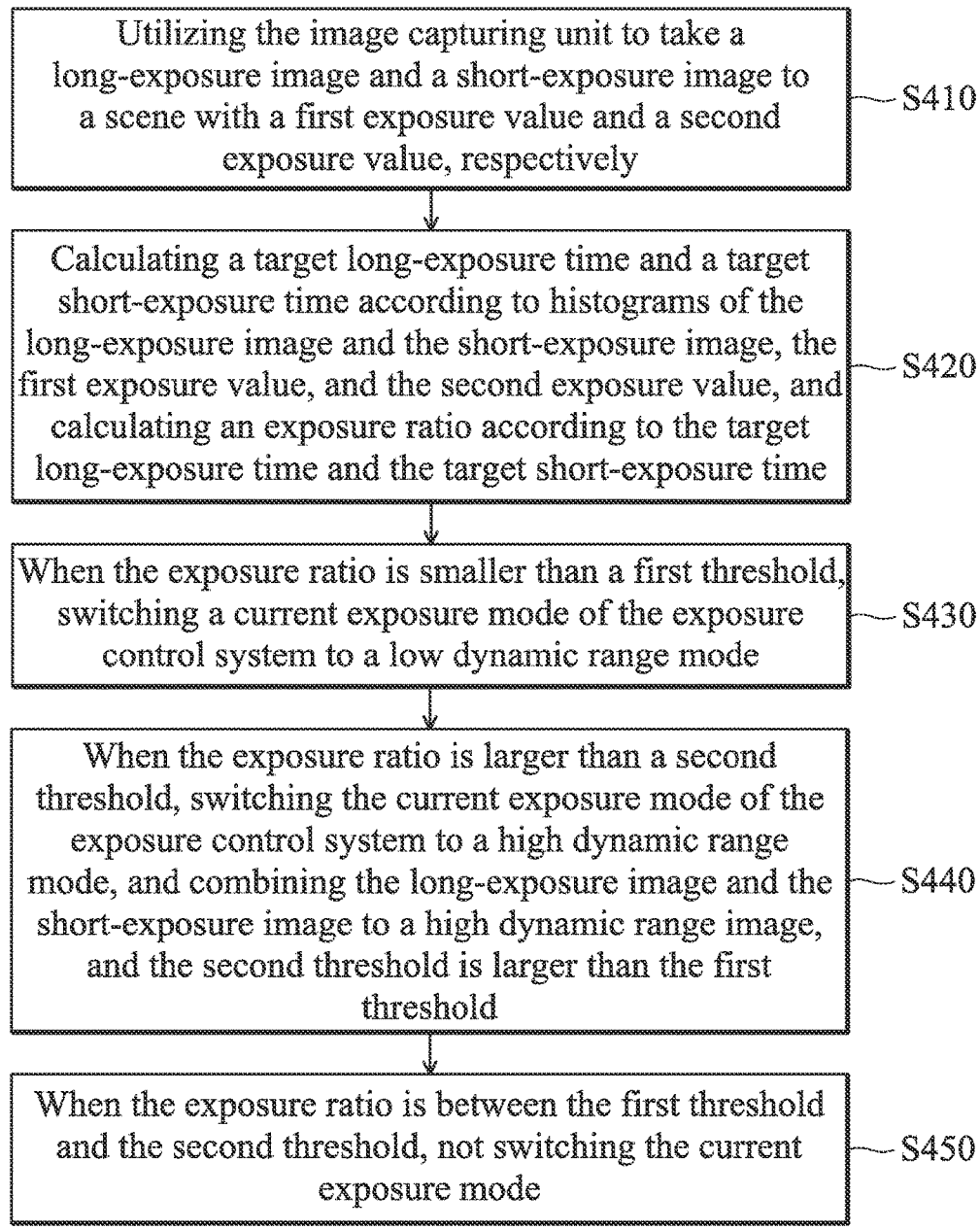
FIG. 4 is a flow chart of an exposure control method in accordance with an embodiment of the invention.

FIG. 4 is a flow chart of an exposure control method in accordance with an embodiment of the invention. In step S410, the image capturing unit 110 captures a long-exposure image and a short-exposure image with a first exposure value and a second exposure value, respectively. It should be noted that the processor 120 updates the first exposure value and the second exposure value after processing each captured image, and the image capturing unit 110 utilizes the updated first exposure value and second exposure value to take next long-exposure image and short-exposure image.

In step S420, the processor 120 calculates histograms of the long-exposure image and the short-exposure image, and calculates an exposure ratio according to the histograms of the long-exposure image and the short-exposure image, the first exposure value, and the second exposure value. The calculation of the exposure ratio can be referred to in the embodiments of FIGS. 2A, 2B, 3A, and 3B.

In step S430, when the exposure ratio is smaller than a first threshold, the processor 120 switches a current exposure mode of the exposure control system 100 to a low dynamic range mode. It should be noted that, if the exposure ratio is smaller than the first threshold, it indicates that the target long-exposure time and target short-exposure time are close. In other words, it indicates that the dynamic range of the long-exposure image and the short-exposure image taken at the same is very limited, and thus the image capturing unit 110 may use the low dynamic range mode to cover the dynamic range of the scene.

In step S440, when the exposure ratio is larger than a second threshold, the processor 120 switches the current exposure mode to a high dynamic range mode, and combines the long-exposure image and the short-exposure image to a high dynamic range image, wherein the second threshold is larger than the first threshold. It should be noted that if the exposure ratio R is larger, it indicates that the difference between the long-exposure time and the short-exposure time is larger, and thus the dynamic range of the long-exposure image and the short-exposure image taken at the same time is also wider. Meanwhile, the image capturing unit 110 has to use the high dynamic range mode to cover the dynamic range of the scene.

In step S450, when the exposure ratio is between the first threshold and the second threshold, the processor 120 does not switch the current exposure mode of the exposure control system 100. It should be noted that the current exposure mode of the exposure control system 100 is not switched between the low dynamic range mode and the high dynamic range mode due to some boundary conditions or noises of the pixels, and flickering of output images can be avoided.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An exposure control system, comprising:
   an image capturing unit, configured to take a long-exposure image and a short-exposure image to a scene with a first exposure value and a second exposure value, respectively; and
   a processor, configured to calculate a target long-exposure time and a target short-exposure time according to histograms of the long-exposure image and the short-exposure image, the first exposure value, and the second exposure value, and calculate an exposure ratio according to the target long-exposure time and the target short-exposure time,
   wherein when the exposure ratio is smaller than a first threshold, the processor switches a current exposure mode of the exposure control system to a low dynamic range mode,
   wherein when the exposure ratio is larger than a second threshold, the processor switches the current exposure mode of the exposure control system to a high dynamic range mode, and combines the long-exposure image and the short-exposure image to a high dynamic range image, and the second threshold is larger than the first threshold,
   wherein when the exposure ratio is between the first threshold and the second threshold, the processor does not switch the current exposure mode.

2. The exposure control system as claimed in claim 1, wherein an exposure time of the first exposure value is larger than or equal to that of the second exposure value.

3. The exposure control system as claimed in claim 1, wherein the processor calculates a first number of pixels having brightness values lower than a first brightness value in the histogram of the long-exposure image,
   wherein when the first number of pixels is larger than a first ratio, the processor further calculates a first predetermined ratio to calibrate the histogram of the long-exposure image, such that the a second number of pixels having brightness values lower than the first brightness value in the calibrated histogram of the long-exposure image is smaller than the first ratio,
   wherein the processor further calibrates the first exposure value according to the first predetermined ratio to calculate the target long-exposure time.

4. The exposure control system as claimed in claim 1, wherein the processor calculates a first number of pixels having within a first brightness interval in the histogram of the long-exposure image,
   wherein when the first number of pixels is larger than a first ratio, the processor further calculates a first predetermined ratio to calibrate the histogram of the long-exposure image, such that the second number of pixels within the first brightness interval in the calibrated histogram of the long-exposure image is smaller than the first ratio,
   wherein the processor further calibrates the first exposure value according to the first predetermined ratio to calculate the target long-exposure time.

5. The exposure control system as claimed in claim 3, wherein the processor further calculates a third number of pixels having brightness values larger than a second brightness value in the histogram of the short-exposure image,
   wherein when the third number of pixels is larger than a second ratio, the processor calculates a second predetermined ratio to calibrate the histogram of the short-exposure image, such that a fourth number of pixels having brightness values larger than the second brightness value in the calibrated histogram of the short-exposure image is smaller than the second ratio,
   wherein the processor further calibrates the second exposure value according to the second predetermined ratio to calculate the target short-exposure time.

6. The exposure control system as claimed in claim 4, wherein the processor further calculates a third number of pixels within a second brightness interval in the histogram of the short-exposure image, wherein when the third number of pixels is larger than a second ratio, the processor calculates a second predetermined ratio to calibrate the histogram of the short-exposure image, such that a fourth number of pixels within the second brightness interval in the calibrated histogram of the short-exposure image is smaller than the second ratio, wherein the processor further calibrates the second exposure value according to the second predetermined ratio to calculate the target short-exposure time.

7. An exposure control method for use in an exposure control system, wherein the exposure control system comprises an image capturing unit, the method comprising:

utilizing the image capturing unit to take a long-exposure image and a short-exposure image to a scene with a first exposure value and a second exposure value, respectively;

calculating a target long-exposure time and a target short-exposure time according to histograms of the long-exposure image and the short-exposure image, the first exposure value, and the second exposure value, and calculating an exposure ratio according to the target long-exposure time and the target short-exposure time;

when the exposure ratio is smaller than a first threshold, switching a current exposure mode of the exposure control system to a low dynamic range mode;

when the exposure ratio is larger than a second threshold, switching the current exposure mode of the exposure control system to a high dynamic range mode, and combining the long-exposure image and the short-exposure image to a high dynamic range image, and the second threshold is larger than the first threshold; and when the exposure ratio is between the first threshold and the second threshold, not switching the current exposure mode.

8. The exposure control method as claimed in claim 7, wherein an exposure time of the first exposure value is larger than or equal to that of the second exposure value.

9. The exposure control method as claimed in claim 7, further comprising:

calculating a first number of pixels having brightness values lower than a first brightness value in the histogram of the long-exposure image;

when the first number of pixels is larger than a first ratio, calculating a first predetermined ratio to calibrate the histogram of the long-exposure image, such that the a second number of pixels having brightness values lower than the first brightness value in the calibrated histogram of the long-exposure image is smaller than the first ratio; and calibrating the first exposure value according to the first predetermined ratio to calculate the target long-exposure time.

10. The exposure control method as claimed in claim 7, further comprising:

calculating a first number of pixels having brightness values within a first brightness interval in the histogram of the long-exposure image;

when the first number of pixels is larger than a first ratio, calculating a first predetermined ratio to calibrate the histogram of the long-exposure image, such that the a second number of pixels within the first brightness interval in the calibrated histogram of the long-exposure image is smaller than the first ratio; and calibrating the first exposure value according to the first predetermined ratio to calculate the target long-exposure time.

11. The exposure control method as claimed in claim 9, further comprising:

calculating a third number of pixels having brightness values larger than a second brightness value in the histogram of the short-exposure image;

when the third number of pixels is larger than a second ratio, calculating a second predetermined ratio to calibrate the histogram of the short-exposure image, such that a fourth number of pixels having brightness values larger than the second brightness value in the calibrated histogram of the short-exposure image is smaller than the second ratio;

calibrating the second exposure value according to the second predetermined ratio to calculate the target short-exposure time.

12. The exposure control method as claimed in claim 10, further comprising:

calculating a third number of pixels having brightness values within a second brightness interval in the histogram of the short-exposure image;

when the third number of pixels is larger than a second ratio, calculating a second predetermined ratio to calibrate the histogram of the short-exposure image, such that a fourth number of pixels within the second brightness interval in the calibrated histogram of the short-exposure image is smaller than the second ratio;

calibrating the second exposure value according to the second predetermined ratio to calculate the target short-exposure time.

* * * * *